(12) United States Patent
Peterson (10) Patent No.: US 12,491,924 B2
(45) Date of Patent: Dec. 9, 2025

(54) WHEELBARROW ACCESSORY

(71) Applicant: Shawn Scott Peterson, Burlington, NC (US)

(72) Inventor: Shawn Scott Peterson, Burlington, NC (US)

(*) Notice: Subject to any disclaimer, the term of this patent is extended or adjusted under 35 U.S.C. 154(b) by 316 days.

(21) Appl. No.: 18/212,553

(22) Filed: Jun. 21, 2023

(65) Prior Publication Data
US 2023/0415803 A1 Dec. 28, 2023

Related U.S. Application Data

(60) Provisional application No. 63/354,375, filed on Jun. 22, 2022.

(51) Int. Cl.
*B62B 5/06* (2006.01)

(52) U.S. Cl.
CPC .................................. *B62B 5/065* (2013.01)

(58) Field of Classification Search
CPC .......... B62B 5/065; B62B 5/064; B62B 1/20; B62B 5/067; B62B 5/06; B62B 9/20; B62B 5/066; B62B 5/062
See application file for complete search history.

(56) References Cited

U.S. PATENT DOCUMENTS

| | | | | |
|---|---|---|---|---|
| 4,951,956 A * | 8/1990 | Vittone | ..................... | B62B 1/20 298/3 |
| 5,163,339 A * | 11/1992 | Giard, Jr. | ............. | B62K 21/125 74/551.8 |
| 5,794,307 A * | 8/1998 | Overcash | ................. | B62B 1/18 16/427 |
| 6,098,492 A * | 8/2000 | Juchniewicz | ............ | B62B 9/20 74/555 |
| 6,550,104 B2 * | 4/2003 | Cacciacarne | ............ | B62B 5/06 D34/27 |
| 7,017,936 B2 * | 3/2006 | Huang | ...................... | B62B 9/20 280/654 |
| 7,121,565 B2 * | 10/2006 | Lulay | ....................... | B62B 5/06 280/47.315 |
| 7,195,248 B1 * | 3/2007 | Miesch | .................. | B62D 51/04 280/47.32 |
| 7,464,441 B2 * | 12/2008 | Peach | ...................... | B62B 1/18 298/3 |
| 7,657,973 B1 * | 2/2010 | Hermann | .................. | B62B 5/06 16/110.1 |
| 7,658,390 B2 * | 2/2010 | Martin | ..................... | B62B 5/06 16/422 |
| 7,818,847 B1 * | 10/2010 | Hermann | ................ | B62B 5/062 16/440 |

(Continued)

*Primary Examiner* — James A Shriver, II
*Assistant Examiner* — Ian Bryce Shelton
(74) *Attorney, Agent, or Firm* — Kali Law Group, P.C.

(57) ABSTRACT

Wheelbarrow accessories are presented including: a base for mechanically coupling with a pair of wheelbarrow arms; and an extendable arm assembly mechanically coupled with the base where the extendable arm assembly is vertically adjustable, the extendable arm assembly including; an outer arm pivotally engaged with the base; an inner arm slidingly engaged with the outer arm along an inner surface of the outer arm, where the inner arm is adjustable to a number of extendable arm lengths; a pad base coupled with the inner arm along a distal end of the inner arm; and a pad coupled with the pad base.

8 Claims, 5 Drawing Sheets

(56) References Cited

U.S. PATENT DOCUMENTS

| | | | | |
|---|---|---|---|---|
| 7,866,004 B1* | 1/2011 | Hermann | B62B 5/06 | 16/110.1 |
| 8,844,948 B1* | 9/2014 | Tanner | B62B 5/067 | 135/66 |
| 9,821,830 B1* | 11/2017 | Matlock | B62B 5/0013 | |
| D887,104 S* | 6/2020 | Allmendinger | D34/27 | |
| 10,752,277 B2* | 8/2020 | Haigh | B62B 5/064 | |
| 10,799,406 B2* | 10/2020 | Minardo | A61G 5/10 | |
| 11,059,508 B1* | 7/2021 | Byrd | B62B 5/065 | |
| 11,117,602 B2* | 9/2021 | Green | B62B 1/20 | |
| 2001/0047569 A1* | 12/2001 | Cacciacarne | B62B 5/06 | 16/426 |
| 2003/0132614 A1* | 7/2003 | Kreamer | A63B 23/16 | 280/647 |
| 2003/0214107 A1* | 11/2003 | Fernandez | B62B 5/06 | 280/47.371 |
| 2003/0218305 A1* | 11/2003 | Nicolay | B62B 5/06 | 280/47.315 |
| 2005/0104310 A1* | 5/2005 | Lulay | B62B 5/06 | 280/47.31 |
| 2006/0027984 A1* | 2/2006 | Huang | B62B 9/20 | 280/47.371 |
| 2008/0296866 A1* | 12/2008 | Martin | B62B 5/06 | 280/304.5 |
| 2009/0013502 A1* | 1/2009 | Cheng | B62B 5/06 | 16/429 |
| 2010/0058555 A1* | 3/2010 | Dube | B62B 5/06 | 16/110.1 |
| 2015/0054241 A1* | 2/2015 | Wierszewski | B62B 5/06 | 280/47.31 |
| 2015/0174755 A1* | 6/2015 | Rhodes | B25G 3/20 | 16/110.1 |
| 2019/0038485 A1* | 2/2019 | Minardo | A61G 5/10 | |
| 2019/0282418 A1* | 9/2019 | Haigh | B62B 5/067 | |
| 2021/0101631 A1* | 4/2021 | Green | B62B 5/062 | |

* cited by examiner

WHEELBARROW ACCESSORY

FIELD OF INVENTION

Embodiments of the present invention relate generally to devices and methods that enable a wheelbarrow user to move loads with less effort and improved control.

BACKGROUND

A wheelbarrow is a highly maneuverable container for moving material short distances. A wheelbarrow can be an unwieldy tool due to the heavy loads it can carry as well as to the one-wheel configuration utilized to support the load while moving. Currently, there exist few solutions that address the need for a more efficient and effective way of advancing a conventional wheelbarrow forward. Some solutions attempt to add additional wheels, but these solutions fail to meet the needs of the industry because they decrease the maneuverability expected in a conventional wheelbarrow. Other solutions attempt to engage more of the arms, but these solutions are similarly unable to meet the needs of the industry because they are bulky and only provide minimal aid to the existing problem. Still, other solutions seek to employ the upper chest of an individual, but these solutions also fail to meet industry needs because they introduce other problems while providing little aid.

As such, wheelbarrow accessories are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Wheelbarrow accessories are presented including: a base for mechanically coupling with a pair of wheelbarrow arms; and an extendable arm assembly mechanically coupled with the base where the extendable arm assembly is vertically adjustable, the extendable arm assembly including; an outer arm pivotally engaged with the base; an inner arm slidingly engaged with the outer arm along an inner surface of the outer arm, where the inner arm is adjustable to a number of extendable arm lengths; a pad base coupled with the inner arm along a distal end of the inner arm; and a pad coupled with the pad base. In some embodiments, the base is a box structure including: a bottom surface positioned along the pair of wheelbarrow arms; and a number of wall surfaces extending upward from the bottom surface, where the extendable arm assembly is pivotally engaged with the base. In some embodiments, the base is a solid block structure including: a bottom surface coupled along the pair of wheelbarrow arms; and a top surface coupled with the extendable arm assembly. In some embodiments, the base is a formed layer including: a pair of base portions each having a bottom surface, the bottom surfaces coupled along the pair of wheelbarrow arms; and a riser portion continuously formed from the pair of base portions, the riser portion having a top surface coupled with the extendable arm assembly. In some embodiments, the outer arm and the inner arm are tubes having a profile such as: a circular profile, a semi-circular profile, a rectangular profile, and a hexagonal profile. In some embodiments, the pad base is coupled with the inner arm along an edge portion of the pad base such that the pad base is vertically adjustable with respect to the extendable arm assembly. In some embodiments, the pad base is pivotably coupled with the inner arm along a distal end of the inner arm. In some embodiments, pad base is sideways pivotable in a range of up to approximately ±20 degrees. In some embodiments, the extendable arm assembly is vertically adjustable in a range of approximately 20 degrees.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

It would be desirable to have a wheelbarrow accessory which can directly transfer energy from a user's body to a wheelbarrow to initiate and maintain forward movement. Such an accessory would free the user's arms and shoulders to provide steering and control. Furthermore, it would also be desirable that the wheelbarrow accessory be adjustable to accommodate an individual's body and fit. Still, further, it would be desirable that the wheelbarrow accessory span and couple to the handles of a wheelbarrow so that energy is efficiently and effectively transferred.

A conventional wheelbarrow currently requires the user to initiate and maintain forward movement by transferring energy from the user's legs, through the shoulders and arms, to the handles. This inefficiency makes forward movement of a wheelbarrow under load difficult. Therefore, a current need exists in the market for a wheelbarrow accessory that overcomes these shortcomings of the conventional wheelbarrow alone.

The disclosed embodiments enable a more efficient pathway of energy transfer from the user to initiate and maintain conveyance of a wheelbarrow over conventional solutions. Further, disclosed embodiments may be adjusted to a user's body shape. Still further, disclosed embodiments are easily and straightforwardly attached to the handles of a wheelbarrow. Similarly, the disclosed methods provide straightforward coupling and multi-directionally adjustments enable the most efficient, effective and repetitive method of transferring the energy necessary, from the user to the wheelbarrow, to commence and perpetuate forward progress.

Furthermore, the methods associated with wheelbarrow accessory embodiments enable any user to affix the accessory simply and effectively to a wheelbarrow using commonly available household tools; provide a user with various possible positions of the base pad to maximize comfort to the user when in use; and allow a user to maintain abdominal contact thru a variety of user movements.

Figure 1:
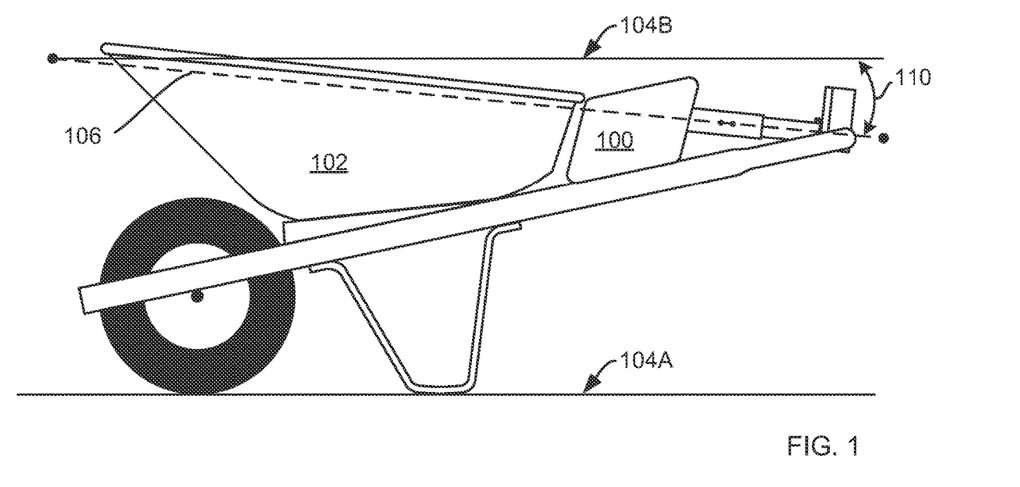
FIG. 1 is an illustrative representation of a wheelbarrow accessory installed on a wheelbarrow in accordance with embodiments of the present invention.

FIG. 1 is an illustrative representation of wheelbarrow accessory 100 installed on wheelbarrow 102 in accordance with embodiments of the present invention. Embodiments provided herein disclose devices and methods that enable the wheelbarrow user to move more loads with less effort. Furthermore, embodiments provided are highly customizable to a user's body. For example, in embodiments, several levels of adjustment are available, namely: vertical adjustment of the extendable arm assembly; extendable adjustment of the extendable arm assembly; vertical adjustment of the pad and pad base; and pivotal adjustment of the pad and pad base. These adjustments may be utilized in any combination without limitation and without departing from embodiments provided herein. As illustrated, FIG. 1 illustrates the vertical adjustment of the extendable arm assembly. As shown, wheelbarrow 102 is mechanically coupled with wheelbarrow accessory 100 and positioned on level ground 104A which represents the ground plane. Ground plane line 104B is provided for clarity in understanding the illustrative representation. Vertical adjustment is demonstrated by line 106, which creates angle 110 with respect to ground plane line 104B. In the illustrated embodiment, extendable arm assembly 100 is substantially aligned with the top of the wheelbarrow bucket or approximately −5.0 degrees with respect to ground plane line 104B. For users with shorter arms, lower placement of the pad provides support at or around the lower torso so that when the user begins to walk, forward energy is applied to the contact pad. This allows the shoulders and arms to be primarily involved in lifting the wheelbarrow from its resting position, steering the wheelbarrow, and lowering the wheelbarrow to its resting position.

Figure 2:
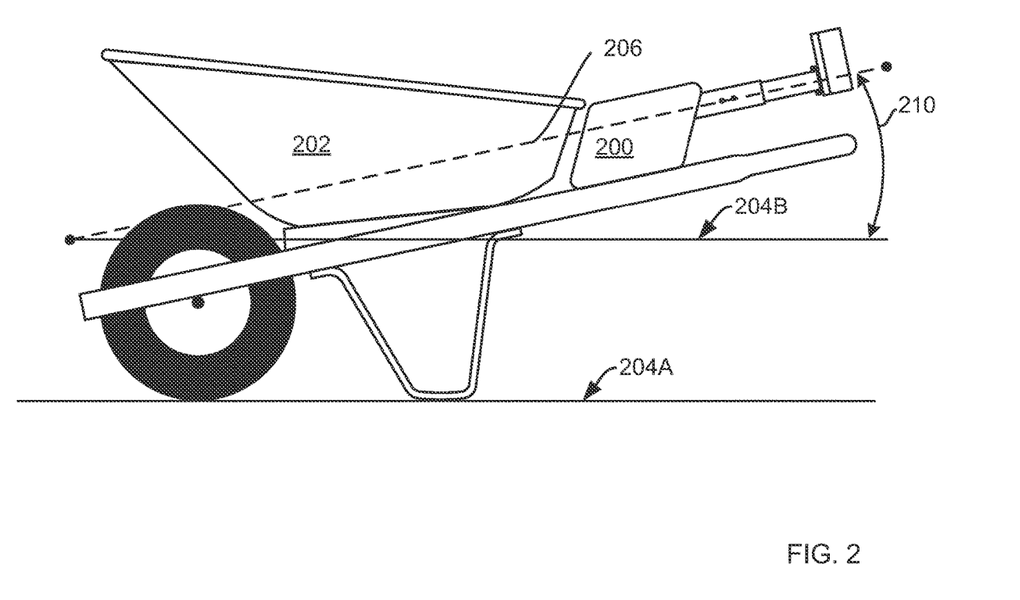
FIG. 2 is an illustrative representation of a wheelbarrow accessory installed on a wheelbarrow in accordance with embodiments of the present invention.

FIG. 2 is an illustrative representation of wheelbarrow accessory 200 installed on a wheelbarrow 202 in accordance with embodiments of the present invention. As illustrated, FIG. 2 illustrates the vertical adjustment of the extendable arm assembly. As shown, wheelbarrow 202 is mechanically coupled with wheelbarrow accessory 200 and positioned on level ground 204A which represents the ground plane. Ground plane line 204B is provided for clarity in understanding the illustrative representation. Vertical adjustment is demonstrated by line 206, which creates angle 210 with respect to ground plane line 204B. In the illustrated embodiment, extendable arm assembly 200 is substantially aligned with the wheelbarrow arms or approximately +15.0 degrees with respect to ground plane line 204B. For users with longer arms, higher placement of the pad provides support at or around the lower torso so that when the user begins to walk, forward energy is applied to the contact pad. This allows the shoulders and arms to be primarily involved in lifting the wheelbarrow from its resting position, steering the wheelbarrow, and lowering the wheelbarrow to its resting position.

Figure 3:
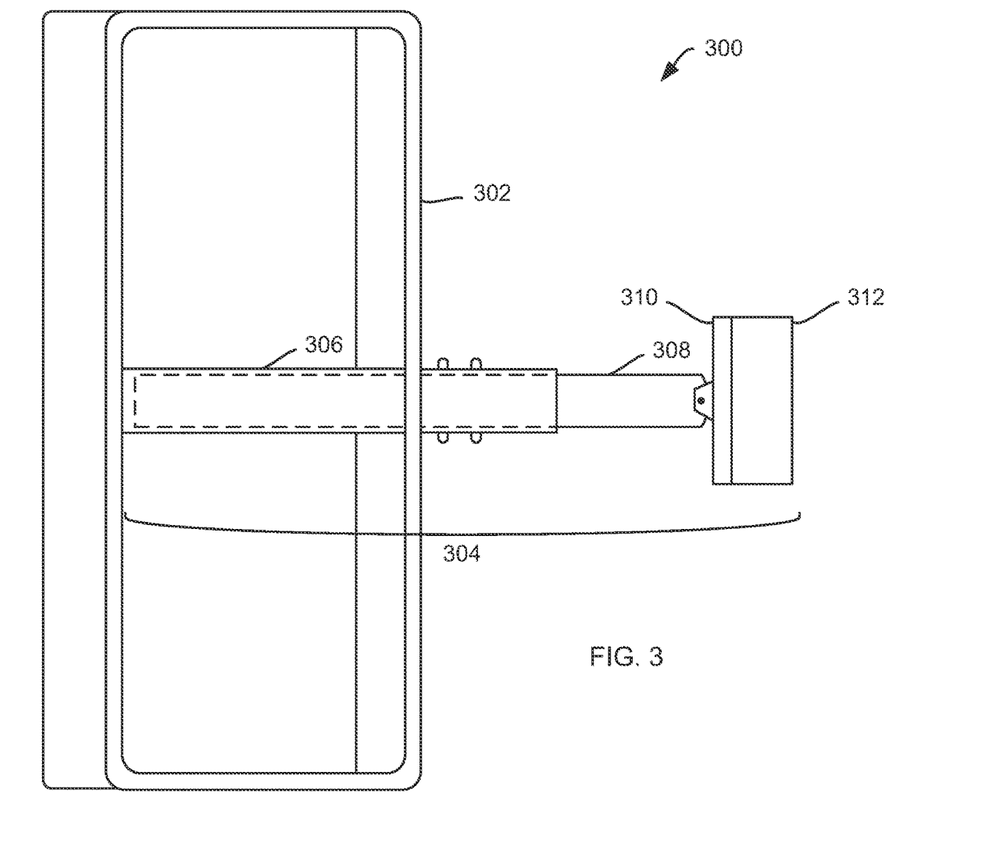
FIG. 3 is an illustrative plan view representation of a wheelbarrow accessory in accordance with embodiments of the present invention.

FIG. 3 is an illustrative plan view representation of wheelbarrow accessory 300 in accordance with embodiments of the present invention. As illustrated, extendable arm assembly 304 is mechanically coupled with base 302. As illustrated, base 302 is a boxed structure that supports extendable arm assembly 304 and further provides a storage function. Base embodiments may be manufactured preferably from molded plastics, wood, metal, or any other suitable material known in the art without limitation. Base embodiments illustrated may be open to provide ease of access or enclosed with a lid (not shown) to provide secure storage. By way of example, illustrated base 302 is substantially a parallelogram in shape. In one illustrative, yet non-limiting, embodiment of the device, the base is approximately 23" wide by 10" deep by 7" tall. In embodiments, the extendable arm assembly may be fixedly coupled with the base or pivotally coupled with the base to provide vertical adjustment. Extendable arm assembly 304 illustrated includes outer arm 306 that is pivotally or fixedly engaged with base 302; inner arm 308 that is slidingly engaged with outer arm 306 along an inner surface of the outer arm; pad base 310 coupled with inner arm 308; and pad 312 coupled with pad base 310. Notably, the inner arm is adjustable to provide a number of extendable arm lengths. Further, in embodiments, outer and inner arms are tubes having a profile such as: a circular profile, a semi-circular profile, a rectangular profile, and a hexagonal profile without limitation. Still further, in embodiments, pads are manufactured from a material such as: an open cell foam material, a closed cell foam material, a polymeric foam material, a natural fiber padding material, a synthetic fiber padding material, and a polymeric compound material without limitation.

Figure 4:
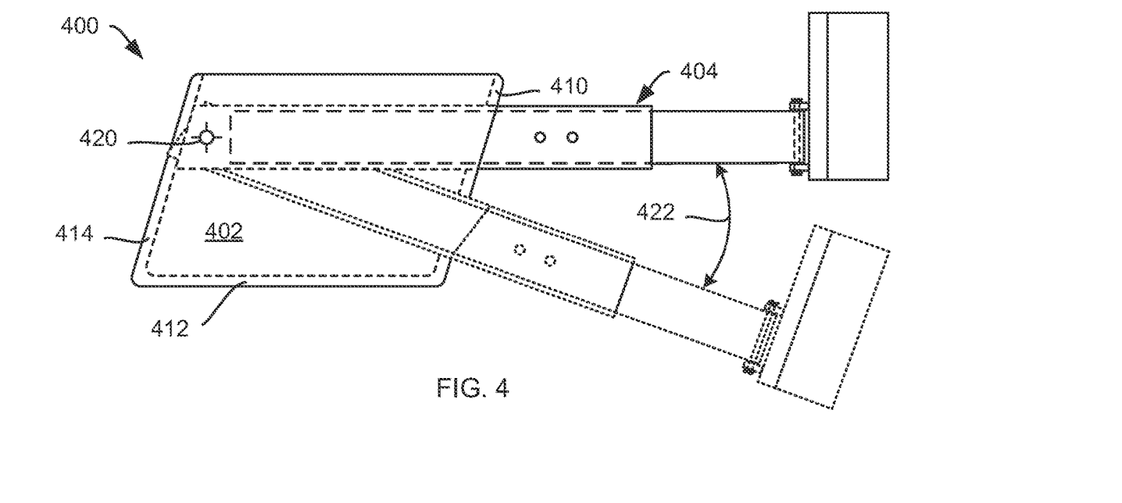
FIG. 4 is an illustrative elevation view representation of a wheelbarrow accessory in accordance with embodiments of the present invention.

FIG. 4 is an illustrative elevation view representation of wheelbarrow accessory 400 in accordance with embodiments of the present invention. As illustrated, base 402 includes bottom surface 412, which may be positioned along a pair of wheelbarrow arms and wall surfaces 410 and 414, which extend upward from bottom surface 412. As above, base 402 is a boxed structure that supports extendable arm assembly 404 and further provides a storage function. Base embodiments may be manufactured preferably from molded plastics, wood, metal, or any other suitable material known in the art without limitation. Base embodiments illustrated may be open to provide ease of access or enclosed with a lid (not shown) to provide secure storage. Further illustrated is extendable arm assembly 404 that is pivotally engaged with base 402 as illustrated by pivot point 420 and vertical adjustment 422. In some embodiments, the extendable arm assembly is vertically adjustable in a range of approximately 20.0 degrees. As noted above, this vertical adjustment allows a user to place the pad along the most useful and/or comfortable position on the torso.

Figure 5:
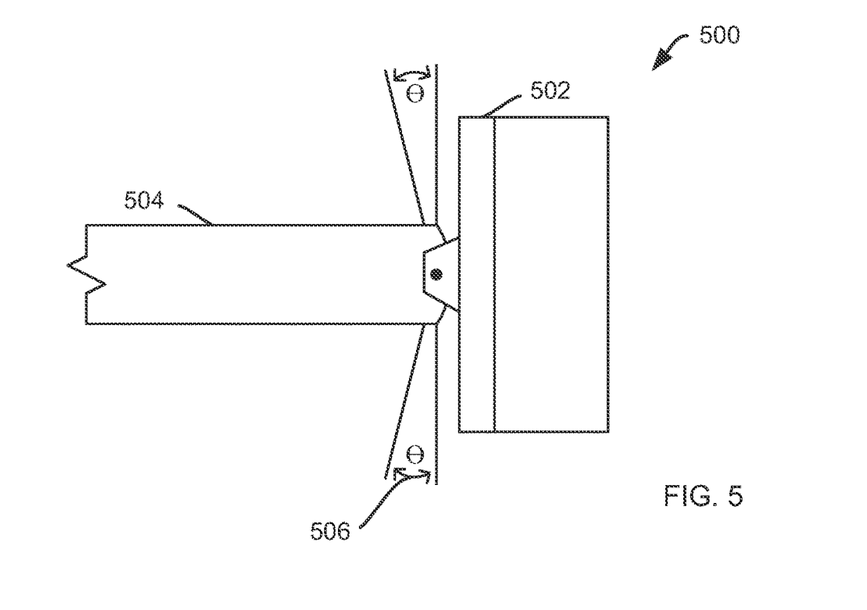
FIG. 5 is an illustrative representation of a wheelbarrow accessory pad base pivotably coupled with an inner arm in accordance with embodiments of the present invention.

FIG. 5 is an illustrative representation of wheelbarrow accessory pad base 502 pivotably coupled with inner arm 504 along a distal end of the inner arm in accordance with embodiments of the present invention. As illustrated, pad base 502 is pivotably adjustable as indicated by range 506. In some embodiments, the pad base is sideways pivotable in a range of up to approximately ±20.0 degrees. Wheelbarrow maneuverability is due to the ability to turn the wheelbarrow on a single wheel utilizing the wheelbarrow arms. In practice, a typical turn is initiated by rotating the wheelbarrow arms and then following the motion with the body. Sideways pivoting of the pad base/pad allows the pad to maintain full contact with a user's torso during a turning maneuver resulting in better control and increased comfort. In some embodiments, the pad base is fixedly coupled with the inner arm and does not provide a sideways pivot action.

Figure 6:
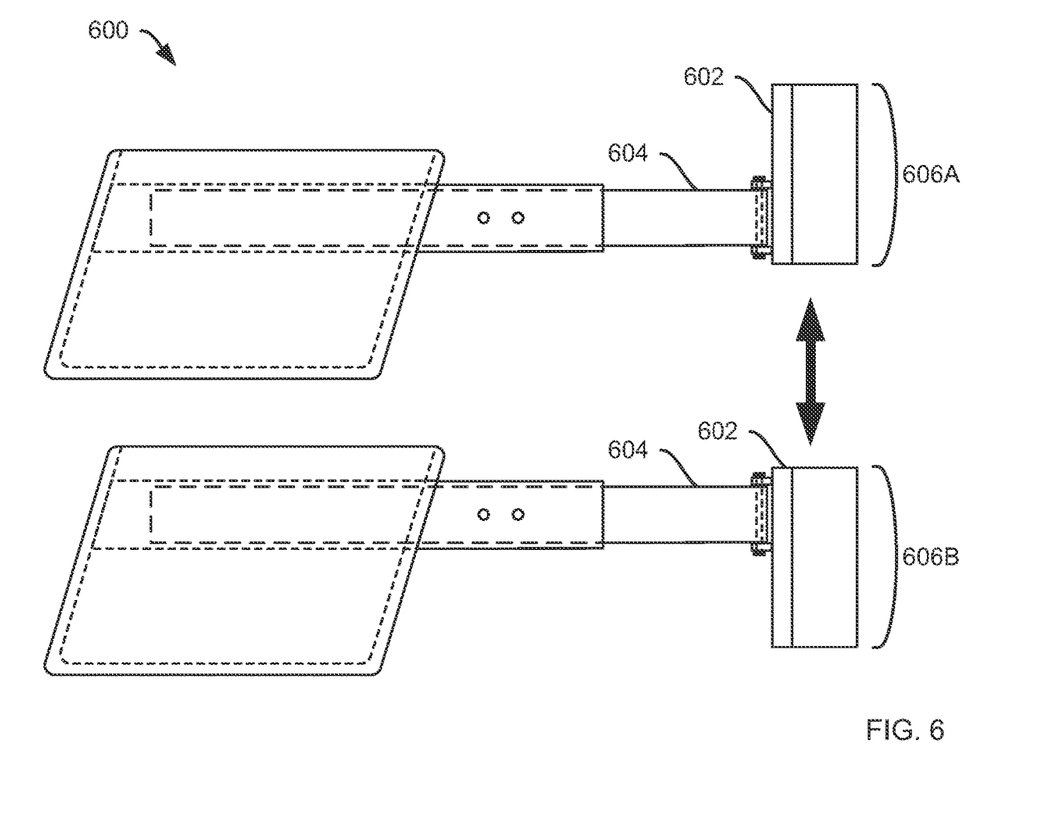
FIG. 6 is an illustrative representation of a wheelbarrow accessory having pad base vertically adjustable with respect to an extendable arm assembly in accordance with embodiments of the present invention.

FIG. 6 is an illustrative representation of wheelbarrow accessory 600 having pad base and pad vertically adjustable with respect to extendable arm assembly in accordance with embodiments of the present invention. As illustrated, pad base 602 pad base is coupled with inner arm 604 along an edge portion of the pad base such that the pad base is vertically adjustable with respect to the extendable arm assembly. That is, pad/pad base may be moved from upper position 606A to lower position 606B by rotating the pad base 180 degrees to accommodate a user's preference. As noted above, for users with shorter arms, lower placement of the pad provides support at or around the lower torso so that when the user begins to walk, forward energy is applied to the contact pad. This allows the shoulders and arms to be primarily involved in lifting the wheelbarrow from its resting position, steering the wheelbarrow, and lowering the wheelbarrow to its resting position. Likewise, for users with longer arms, higher placement of the pad provides support at or around the lower torso so that when the user begins to walk, forward energy is applied to the contact pad. This allows the shoulders and arms to be primarily involved in lifting the wheelbarrow from its resting position, steering the wheelbarrow, and lowering the wheelbarrow to its resting position.

Figure 7:
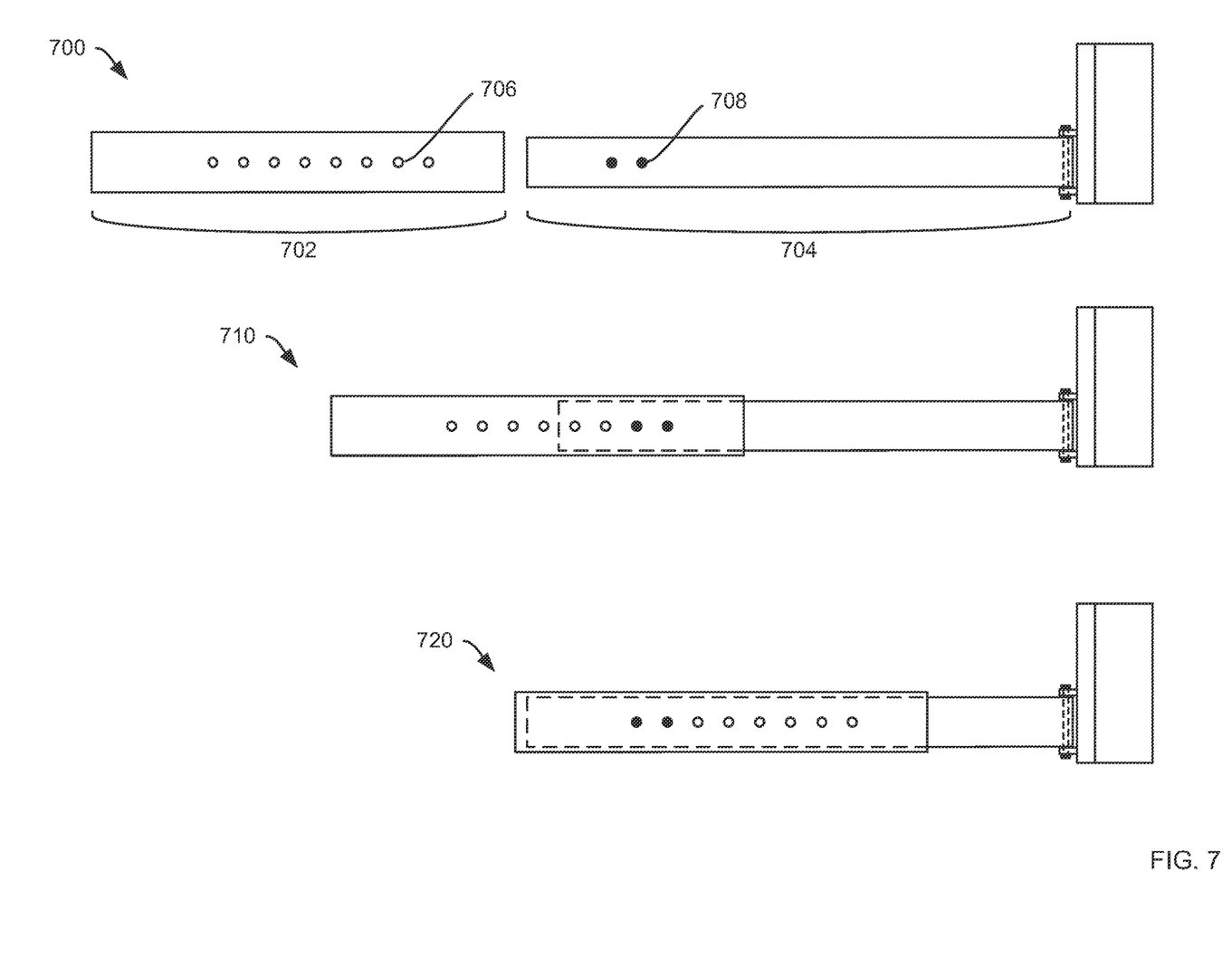
FIG. 7 is an illustrative representation of a wheelbarrow accessory extendable arm assembly in accordance with embodiments of the present invention.

FIG. 7 is an illustrative representation of a wheelbarrow accessory extendable arm assembly in accordance with embodiments of the present invention. In particular, FIG. 7 illustrates an extendable arm assembly in exploded position 700, partially retracted position 710, and fully retracted position 720. Extendable arm assemblies illustrated include inner arm 704 that is slidingly engaged with outer arm 702 along an inner surface of the outer arm. Inner arm 704 includes locking spring button(s) 708 that engages with adjustment holes 706 to provide a number of extendable arm lengths. Further, in embodiments, outer and inner arms are tubes having a profile such as: a circular profile, a semi-circular profile, a rectangular profile, and a hexagonal profile without limitation. In embodiments, outer arms, inner arms, and locking spring buttons may be composed of a material or combination of materials able to withstand the predetermined forces imposed when the device is in use. Extendable arm assembly embodiments provide for accommodating differently sized users. For example, a large chested male user may prefer a shorter length of wheelbarrow accessory embodiments made possible by extendable arm assembly embodiments. Likewise, a smaller user may prefer a longer length of wheelbarrow accessory embodiments made possible by extendable arm assembly embodiments.

Figure 8:
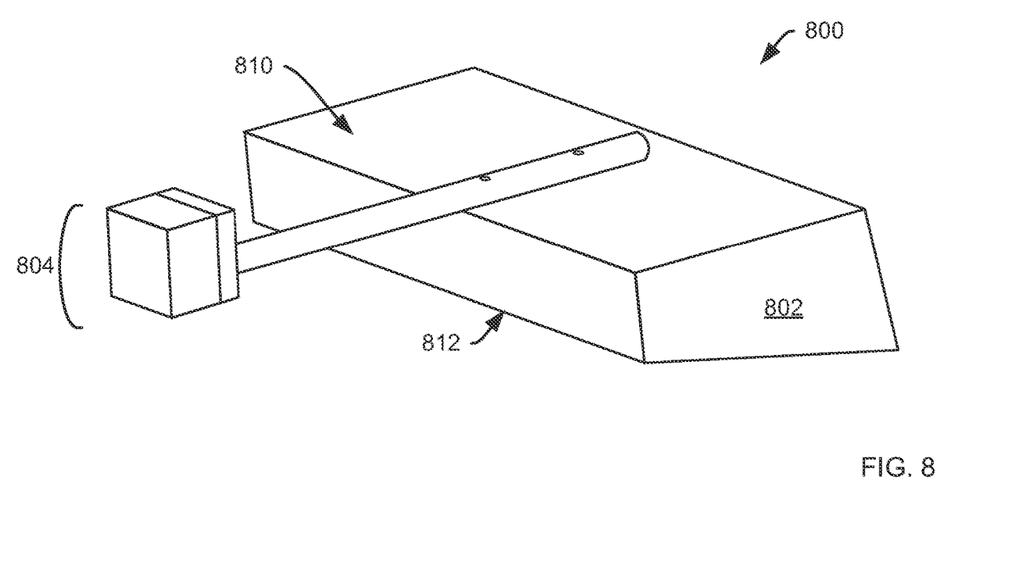
FIG. 8 is an illustrative representation of an alternative wheelbarrow accessory in accordance with embodiments of the present invention.

FIG. 8 is an illustrative representation of alternative wheelbarrow accessory 800 in accordance with embodiments of the present invention. As illustrated, base 802 is a solid block structure that includes bottom surface 812 which may be coupled along a pair of wheelbarrow arms and top surface 810 coupled with extendable arm assembly 804. In embodiments, the base may, at minimum, span the distance between wheelbarrow handles on a wheelbarrow so that the base may couple with both wheelbarrow handles. In one embodiment, the front side of the base is 5.0" in height; the back side is 7.0" in height; and the base is 10" in depth. These measurements are merely illustrative and bases of any width, height and depth that include the features described herein are intended to be within this disclosure and make up the overall invention, which has many different embodiments.

Figure 9:
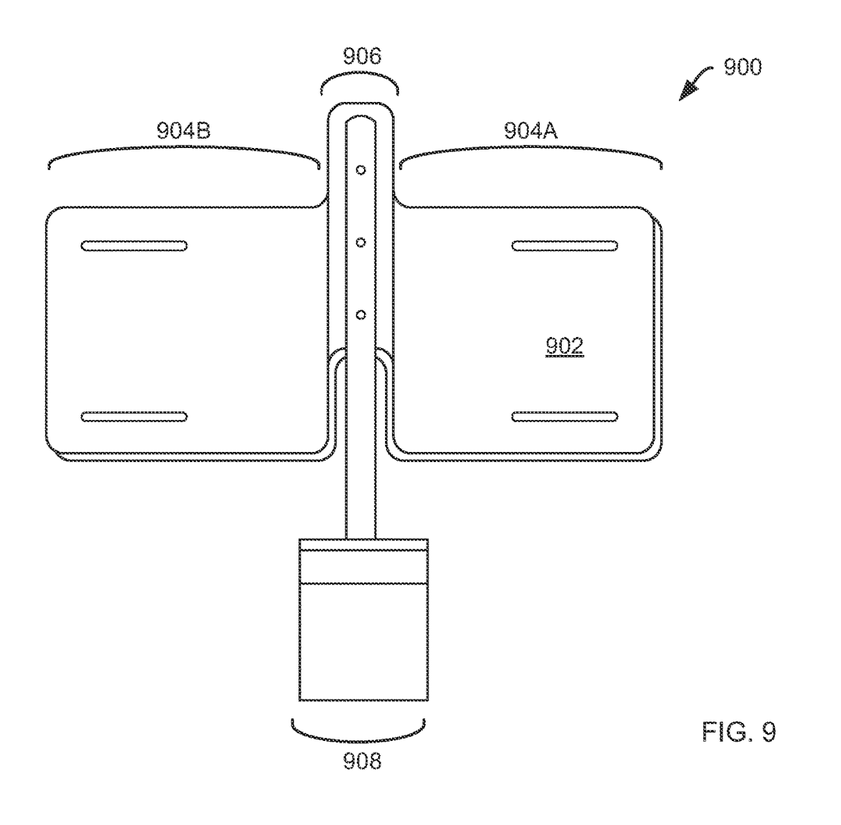
FIG. 9 is an illustrative representation of an alternative wheelbarrow accessory in accordance with embodiments of the present invention.

FIG. 9 is an illustrative representation of alternative wheelbarrow accessory 900 in accordance with embodiments of the present invention. As illustrated, base 902 includes base portions 904A and 904B each having a bottom surface which may be coupled along a pair of wheelbarrow arms. Base 902 further includes riser portion 906 continuously formed from base portions 904A and 904B, the riser portion having a top surface coupled with extendable arm assembly 908. In embodiments, the riser portion includes a predetermined height and a width or may encompass the entirety of the base. Base embodiments may preferably be manufactured using formed or molded plastic but may also be manufactured from but not limited to wood or metals. In one particular and illustrative, yet non limiting, embodiment of the base, the base may be substantially rectangular and may span the distance between the two handles of a wheelbarrow. In one embodiment, the back side of the base riser may be 7" in height; the front side of the base riser may be 5" in height. The angle of downward declination is in a range of approximately 15 to 35 degrees. In some embodiments, the angle of downward declination is approximately 23 degrees. These measurements are provided for clarity in disclosing embodiments provided herein and should not be construed as limiting with respect to dimensions cited.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A wheelbarrow accessory comprising:
   a base for mechanically coupling with a pair of wheelbarrow arms;
   and an extendable arm assembly mechanically coupled with the base wherein the extendable arm assembly is vertically adjustable, the extendable arm assembly comprising;
   an outer arm pivotally engaged with the base;
   an inner arm slidingly engaged with the outer arm along an inner surface of the outer arm, wherein the inner arm is adjustable to a plurality of extendable arm lengths;
   a pad base coupled with the inner arm along a distal end of the inner arm; and
   a pad coupled with the pad base wherein,
      the pad base is pivotably coupled with the inner arm along the distal end of the inner arm and wherein,
      the pad base is sideways pivotable in a range of up to approximately ±20 degrees.

2. The wheelbarrow accessory of claim 1, wherein the base is a box structure comprising:
   a bottom surface positioned along the pair of wheelbarrow arms; and
   a plurality of wall surfaces extending upward from the bottom surface, wherein the extendable arm assembly is pivotally engaged with the base.

3. The wheelbarrow accessory of claim 1, wherein the outer arm and the inner arm are tubes having a profile selected from the group consisting of: a circular profile, a semi-circular profile, a rectangular profile, and a hexagonal profile.

4. The wheelbarrow accessory of claim 1, wherein the pad base is coupled with the inner arm along an edge portion of the pad base such that the pad base is vertically adjustable with respect to the extendable arm assembly.

5. The wheelbarrow accessory of claim 1, wherein the pad is manufactured from a material selected from the group consisting of: an open cell foam material, a closed cell foam material, a polymeric foam material, a natural fiber padding material, a synthetic fiber padding material, and a polymeric compound material.

6. The wheelbarrow accessory of claim 1, wherein the extendable arm assembly is vertically adjustable in a range of approximately 20 degrees.

7. A wheelbarrow accessory comprising:
   a base for mechanically coupling with a pair of wheelbarrow arms, wherein the base is a solid block structure comprising:
      a bottom surface coupled along the pair of wheelbarrow arms; and
      a top surface; and
   an extendable arm assembly mechanically coupled along the top surface of the base, the extendable arm assembly comprising;
      an outer arm coupled with the base;
      an inner arm slidingly engaged with the outer arm along an inner surface of the outer arm, wherein the inner arm is adjustable to a plurality of extendable arm lengths;
      a pad base coupled with the inner arm along a distal end of the inner arm; and
      a pad coupled with the pad base wherein,
         the pad base is pivotably coupled with the inner arm along the distal end of the inner arm and wherein,
         the pad base is sideways pivotable in a range of up to approximately ±20 degrees.

8. A wheelbarrow accessory comprising:
   a base for mechanically coupling with a pair of wheelbarrow arms, wherein the base is a formed layer comprising:
      a pair of base portions each having a bottom surface, the bottom surfaces coupled along the pair of wheelbarrow arms; and
      a riser portion continuously formed from the pair of base portions; and
   an extendable arm assembly mechanically coupled with the top surface of the riser portion, the extendable arm assembly comprising;
      an outer arm coupled with the base;
      an inner arm slidingly engaged with the outer arm along an inner surface of the outer arm, wherein the inner arm is adjustable to a plurality of extendable arm lengths;
      a pad base coupled with the inner arm along a distal end of the inner arm; and
      a pad coupled with the pad base wherein,
         the pad base is pivotably coupled with the inner arm along the distal end of the inner arm and wherein,
         the pad base is sideways pivotable in a range of up to approximately ±20 degrees.

* * * * *